United States Patent [19]

Nishikawa

[11] Patent Number: 5,372,247
[45] Date of Patent: Dec. 13, 1994

[54] CONVEYOR

[75] Inventor: Hisao Nishikawa, Kyoto, Japan

[73] Assignee: Murata Kikai Kabushiki Kaisha, Kyoto, Japan

[21] Appl. No.: 90,740

[22] Filed: Jul. 13, 1993

[30] Foreign Application Priority Data

Jul. 24, 1992 [JP] Japan .................. 4-057691

[51] Int. Cl.⁵ ............................................. B65G 13/02
[52] U.S. Cl. .................................. 198/780; 198/789; 198/861.1
[58] Field of Search ............... 198/860.2, 861.1, 781, 198/735.2, 735.6, 790, 780, 789

[56] References Cited

U.S. PATENT DOCUMENTS

| | | | |
|---|---|---|---|
| 4,282,968 | 8/1981 | Temme | 198/735.2 |
| 4,815,588 | 3/1989 | Katsuragi et al. | 198/781 |
| 4,917,226 | 4/1990 | Blocker | 198/861.1 |
| 4,930,623 | 6/1990 | Johnson et al. | 198/861.1 |
| 4,951,809 | 8/1990 | Boothe et al. | 198/860.2 |
| 4,993,541 | 2/1991 | Roh | 198/781 |
| 5,082,108 | 1/1992 | Douglas | 198/861.1 |
| 5,129,507 | 7/1992 | Maeda et al. | 198/861.1 |
| 5,137,145 | 8/1992 | Clopton | 198/860.2 |

*Primary Examiner*—Joseph E. Valenza
*Attorney, Agent, or Firm*—Spensley Horn Jubas & Lubitz

[57] ABSTRACT

A conveyor having a drawn member which has an indentation longthway along the outer surface thereof, as right and left frame for holding transfer members of rollers which support transfer object. The indentation has at both edges grooves into which a mask plate is able to be inserted so that an enclosed space is formed within the indentation with the mask plate.

3 Claims, 4 Drawing Sheets

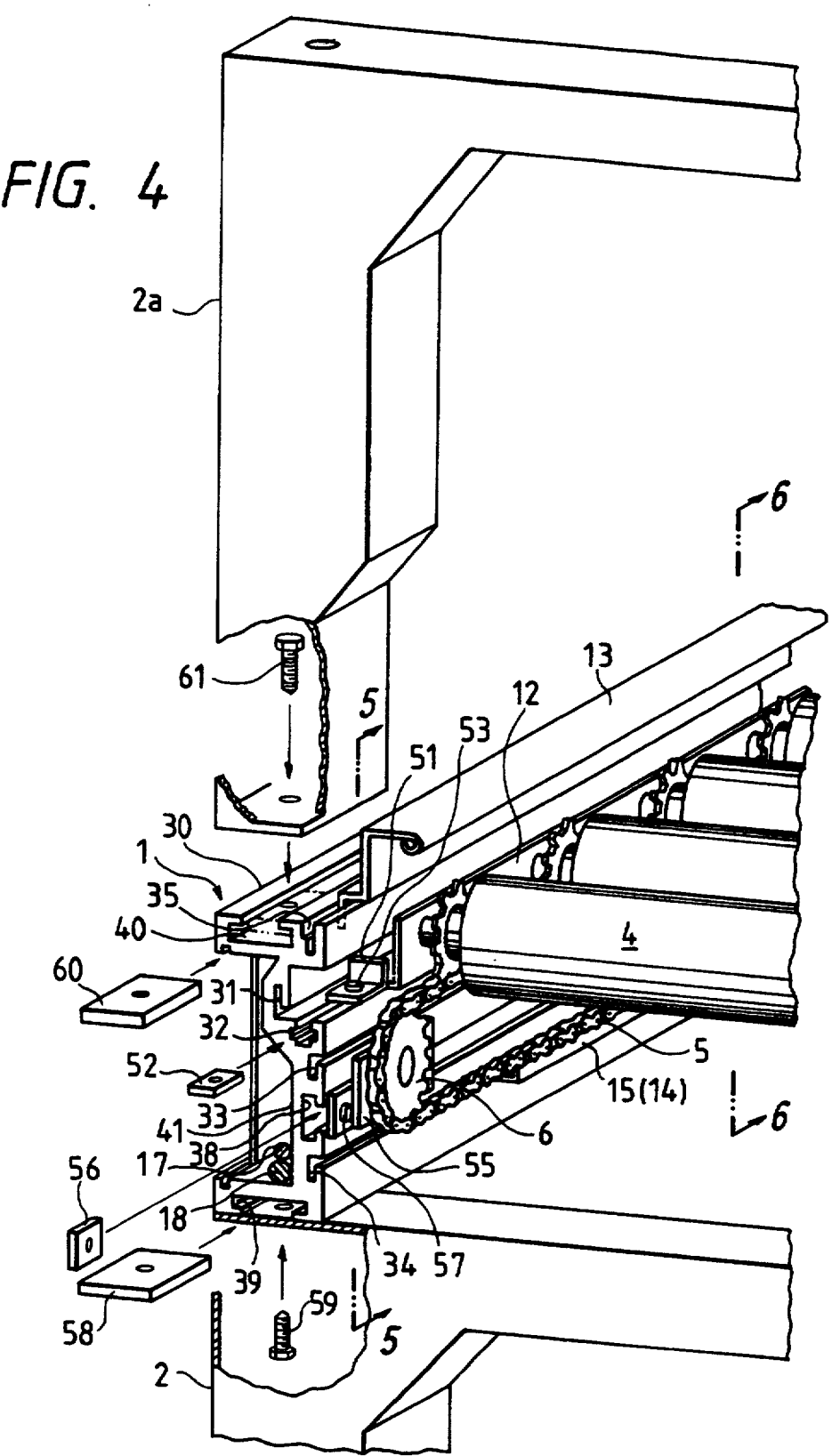

CONVEYOR

BACKGROUND OF THE INVENTION

1. Field of the Invention

The present invention relates to a conveyor in which a number of rollers, an endless belt or other transfer members are supported between right and left side frames which are fixed in place by a base member and which said conveyor is in particular used for conveying trays into which have been inserted packages which are employed in a textile factory processing line, or other such relatively small objects.

2. Prior Art

In a textile factory, the yarn is processed to form a package and is conveyed between machines. In order to protect the yarn layers of synthetic fiber packages it is not possible to lay the packages on their sides and so that they can be easily grasped by the loading robot, the packages are conveyed when inserted onto a peg shaft. There are round trays with a central peg shaft and square shaped trays in which the shaft extends out sideways. A conveyor is employed for conveying these trays. At largest, the trays are about 30 cm diameter and the weight of the packages is, at maximum, about 15 kg. Further, because there is a relatively large number of bends along the conveyor route, the longest straight sections are at most 6 m or less.

In a conventional general purpose tray conveyor, the right and left side frames are fixed by means of a base member which is provided laterally in an appropriate area with a number of rollers being supported between the two side frames and driven so that they rotate and on top of which run the trays. The side frames of the conventional tray conveyor is employed by an angle plate. In order to support the roller at this angle plate, a number of bolt holes are made and the roller is supported by screwing the bolts into the bolt holes. Further, the angle plate is welded or fixed to base member by some other means. However, because the conventional conveyor uses the angled plate as a side frame, a large number of bolt holes must be made and the number of places for adjustment is increased accordingly. For this reason, the number of man hours required for installation of even a relatively small and short conveyor, does not differ appreciably from that of a conveyor of normal size and so there is a limit to how far the installation costs can be reduced.

SUMMARY OF THE INVENTION

The present invention has been conceived by looking at this type of problem in the prior art and the purpose of the present invention is to provide a conveyor that requires a small number of man hours to install so that the cost of the conveyor can be kept down.

In order to achieve the above purpose, the conveyor of the present invention employs members which are made by a drawing process and have insertion grooves, and which act as right and left side frames which support the transfer objects. Into these insertion grooves at least the part which supports the transfer members is inserted and held.

The conveyor can be easily assembled simply by inserting the roller support plate etc. into the insertion grooves in the drawn members.

BRIEF DESCRIPTION OF THE DRAWINGS

FIG. 4 is a diagonal view of the main section of the conveyor of the present invention.

DETAILED DESCRIPTION OF PREFERRED EMBODIMENT

Figure 1:
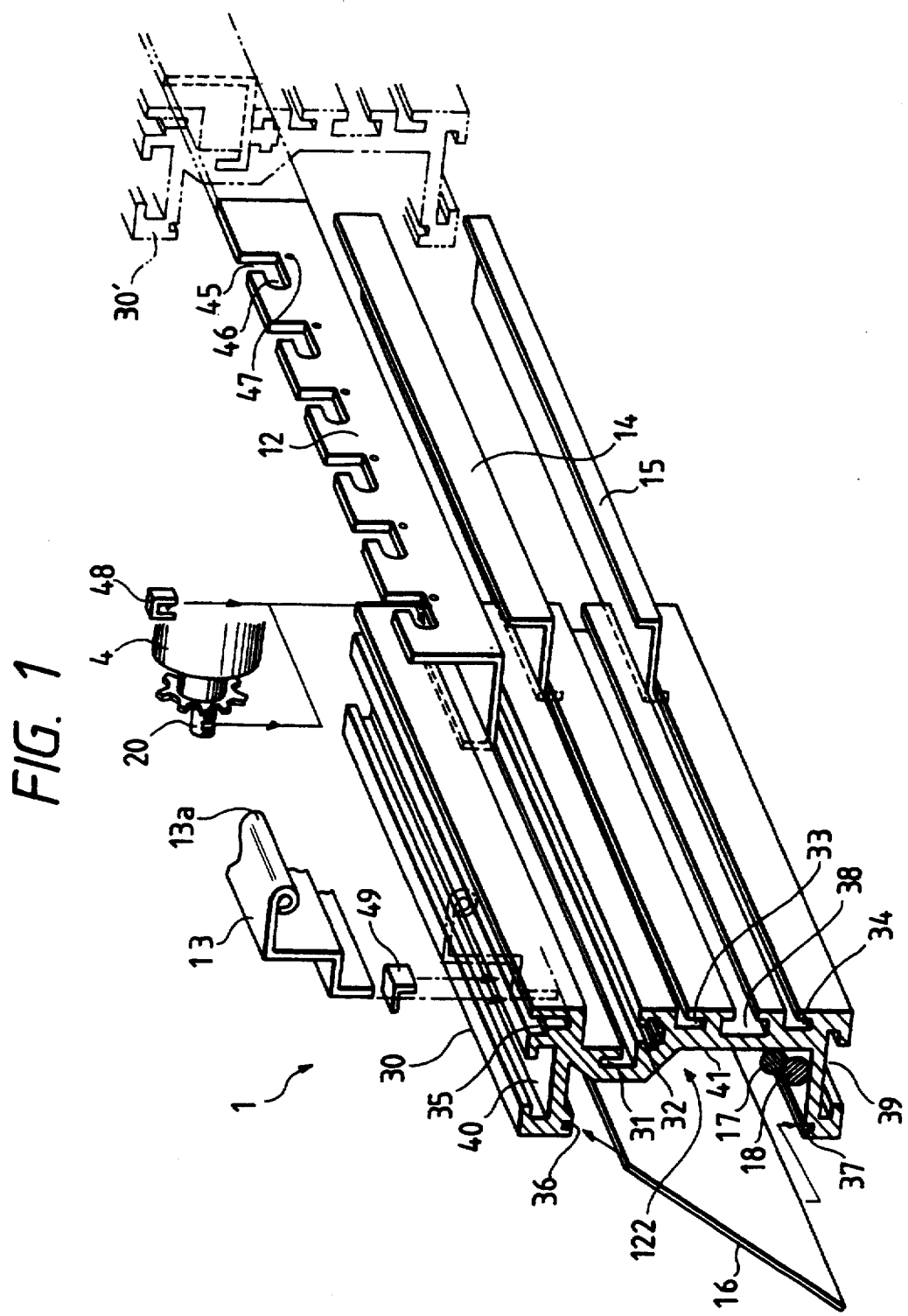
FIG. 1 is a diagonal view of the side frame in the conveyor of the present invention.
Figure 2:
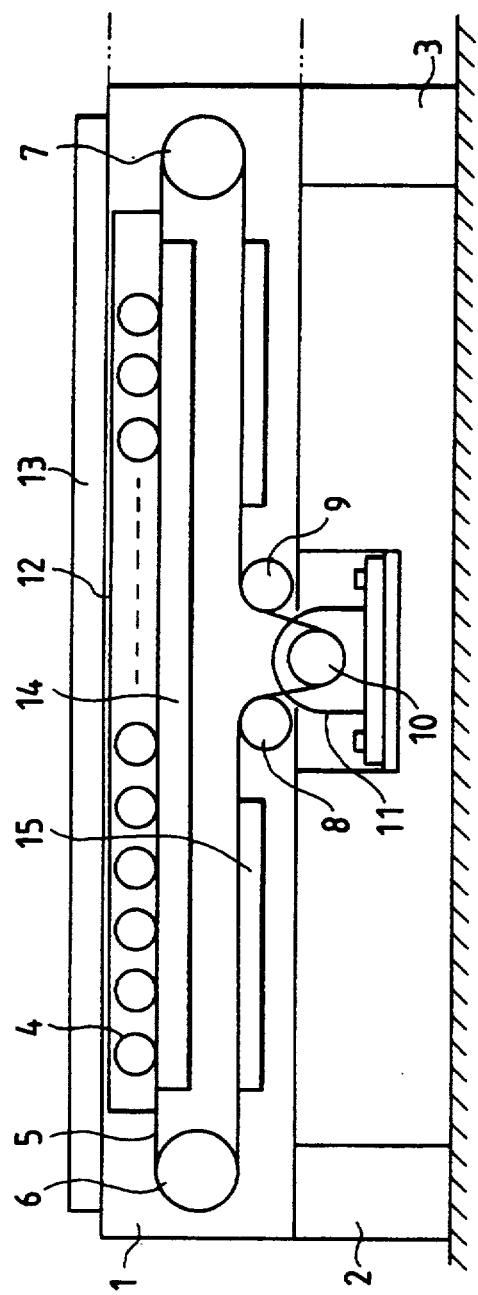
FIG. 2 is an installation diagram of the conveyor parts.
Figure 3:
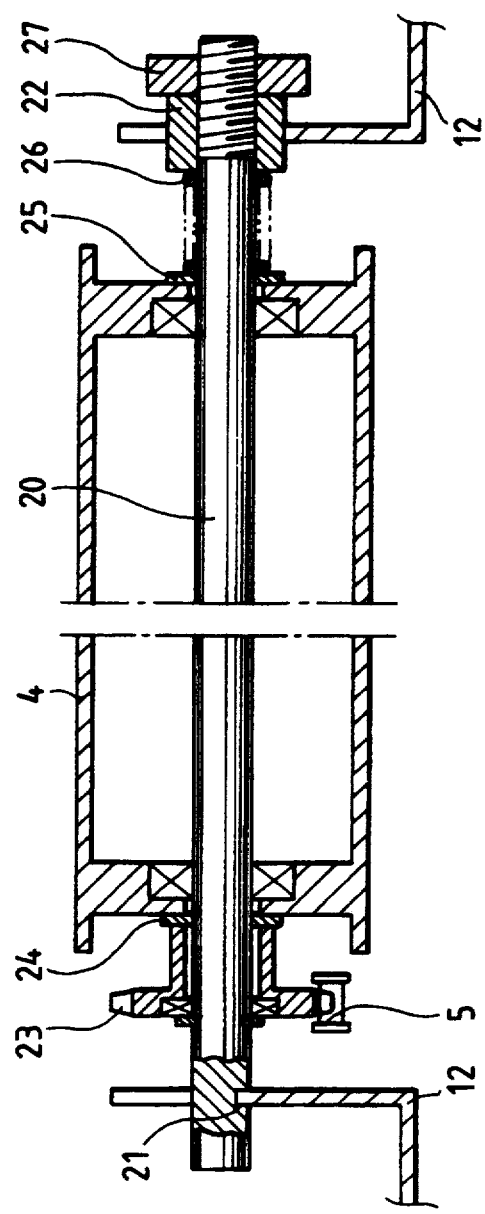
FIG. 3 is a cross section of the roller.

The following is an explanation of a preferred embodiment of the present invention with reference to the drawings. FIG. 1 is a diagonal view of the side frame of the conveyor of the present invention, FIG. 2 is an installation diagram of the conveyor parts and FIG. 3 is a cross section of the roller. Firstly, the conveyor as a whole will be explained with reference to FIG. 2 and FIG. 3, after which each section will be explained.

Firstly, in FIG. 2, the right and left side frames 1 are supported by the base plates 2 and 3 and a plurality of rollers 4 are lined up between the side frames. These rollers 4 are driven by the chain 5 which is wound across the sprockets 6 and 7 at each end and, via the guide sprockets 8 and 9, runs by means of the driving sprocket 10 which is linked to the motor 11. Further, the roller support plate 12 which supports a plurality of rollers 4, the protection plate 13, the upper chain support plate 14 and the lower chain support plate 15 etc. are installed on the side frame 1. Further, it is easy to adjust the tension of the chain 5 if the guide sprockets 8 and 9 can move right and left or if the motor can slide up and down. In FIG. 3, the roller 4 is supported across the fixed shaft 20 so that the roller 4 rotates on the axis of the fixed shaft 20 and one end of the fixed shaft 20 has a slit 21 fitting into the roller support plate 12 and is supported by the roller support plate 12, and the other end goes through the collar 22 and is supported by the roller support plate 12 so it is possible for it to rotate and move along the axis of the shaft 20. The sprocket 23 which engages with the chain 5 is also supported on the fixed shaft 20 and the rotational power of the sprocket 23 is transmitted to one end of the roller 4 by the friction plate 24. The force of a compression spring 26, via a low friction sliding plate 25, works on the other end of the roller 4 and the degree of compression of the compression spring 26 can be adjusted by the nut 27. This compression spring 26 operates as a torque clutch and if an excessive amount of power operates on the roller 4, the sprocket 23 is revolved free of the friction plate 24 so that the driving power is not transmitted to the roller 4.

Next, in FIG. 1, differing from a conventional general purpose conveyor, an aluminium alloy drawn member 30 is employed as the side frame 1. This member 30 is made by a drawing process using a die. By making the die of the desired shape it is possible to get an inexpensive drawn member 30 having a cross section with the desired insertion groove and having a regular shape wherever it is positioned. As shown in the drawings, an L shaped insertion groove 31 into which the roller support plate 12 is inserted from one end and maintained, a T shaped insertion groove 32 for holding the roller support plate 12 stopper in place, an L shaped insertion groove 33 into which the upper chain support plate 14 is inserted from the end and maintained, an L shaped insertion groove 34 into which the lower chain support plate 15 is inserted from the end and maintained, a stepped insertion groove 35 into which the protection plate 13 is inserted, an upper insertion groove 36 and lower insertion groove 37 into which the mask plate 16 is moved up and down and inserted, a T shaped insertion groove 38 which holds in place the sprocket holder 55, T shaped insertion grooves 39 and 40 for holding in place the upper and lower base plates, the motor box etc. and the indented section 41 for putting away the cable 17 and pipe 18 are provided. In particular, because the ends of the roller support plate 12 and the upper chain support plate 14 and the lower chain support plate 15 are L shaped so as to fit into the L shaped inserts 31, 33 and 34 it is not possible to insert them except from one end so they are held when inserted. The abovementioned upper insertion groove 36 and lower insertion groove 37 are provided at the upper and lower edges of the indented section 41 and together with the mask plate 16, form the space 122.

Furthermore, the composition of the support for the rollers 4 will be explained. Provided in the roller support plate 12 is a vertical cut 45 which is open at the upper end, a horizontal cut 46 with which the vertical cut intersects and the indented hole 47 below the vertical cut 45. The vertical cut 45 and the horizontal cut 46 form an L shaped cut. One end of the fixed shaft 20 which is the roller 4 shaft is inserted from the vertical cut 45 and slides to the end of the horizontal cut 46, and then a clip 48 having a protruding section is inserted under the vertical cut 45 and engaged with the concave hole 47, thereby the roller 4 is fixed in place. Further, in the end of the opposite side, not shown in the drawings of rollers 4, a collar 22 is slipped through a large vertical cut and a horizontal cut. In this way, because it is possible to first install the roller support plate 12 in the side frame 1 and then install the rollers 4 in the roller support plate 12, is not necessary to first install the rollers 4 in the roller support plate 12 and then go on to the insertion step, facilitating easy assembly of the conveyor.

Figure 5:
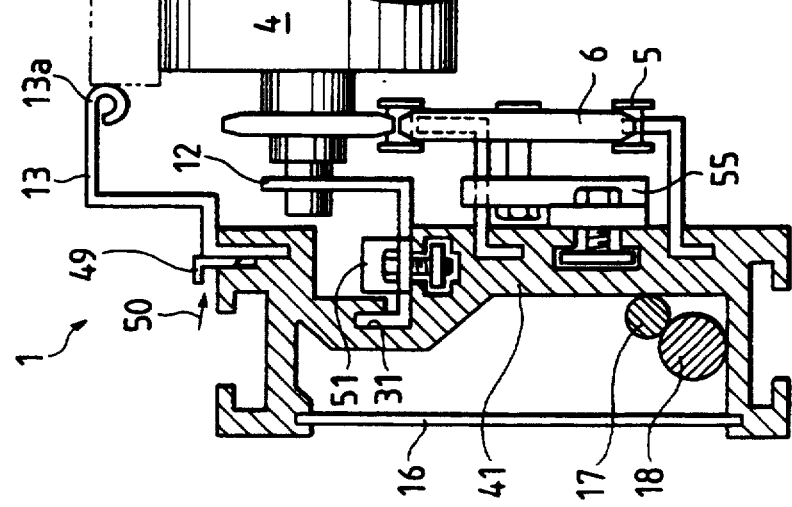
FIG. 5 is a cross section of the section marked 5—5 in FIG. 4.

When the assembly of the rollers 4 is complete, the protection plate 13 is inserted from above into the stepped groove 35 and the spacer 49 is pushed into the gap between the protection plate 13 and stepped groove 35 so that the protection plate 13 is held in place on the side frame 1. The spacer 49 is, for example, of a hard rubber or plastic and is formed in an L shape and inserted laterally wherever necessary. Because it is of an L shape, as shown by the arrow 50 in FIG. 5, when it is wrenched up by the driver, it comes away easily and the protection plate 13 can fall off. Further, the protection plate 13 is not simply a safety cover, but the end becomes the curved part 13a and as shown in FIG. 5, has the same function as a guide for the trays 19 running above the rollers 4.

As shown in FIG. 1 the drawn member 30 has a variety of grooves and using these grooves, the drawn member 30 can be easily linked laterally. For example, if the roller support member 12 is longer than the drawn member 30, it will stick out from the drawn member 30. If the protruding portion of the roller support member 12 is inserted into the second drawn member 30', it is possible to link the drawn members 30 and 30'. Further, without being limited to when the roller plate 12 is being employed as a link member, a hole for a bolt is provided at each end section of a long board which is inserted into a T shape groove 40. The long board straddles and is inserted into the drawn members 30 and 30' and even when the long board is fixed by a bolt to the spacer, which touches the upper surface of the drawn members 30 and 30', it can be easily linked.

Figure 6:
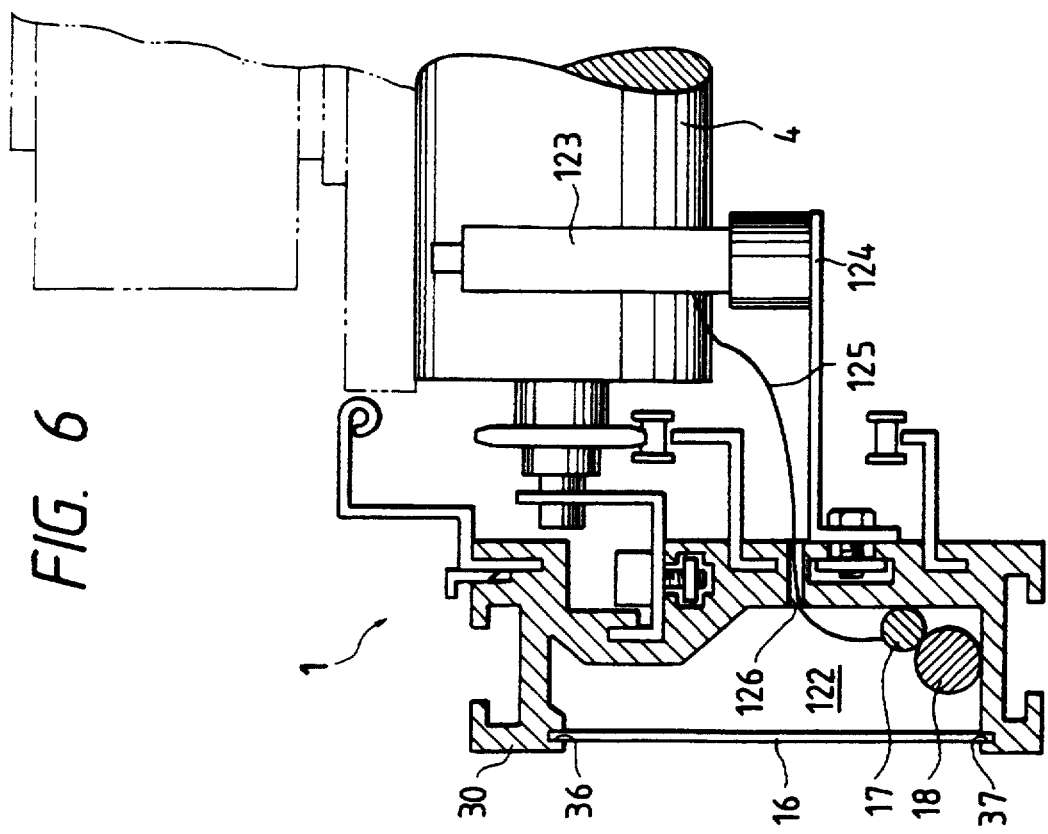
FIG. 6 is a cross section of the section marked 6—6 in FIG. 4.

Another assembly part of the conveyor will be explained with reference to FIGS. 4 and 5. FIG. 4 is a diagonal section of the main section of the conveyor and FIG. 5 is the cross section 5—5 of FIG. 4. The side frame 1 shown in FIG. 4 is arranged symmetrically on the right and left and the right hand side frame, not shown in the drawing, is symmetrical to the side frame 1. The roller support plate 12, incorporated in the rollers 4, will slip out of place if it is simply inserted into an L shape groove 31. This is why there are stoppers 51 positioned at each end of the roller support plate 12, and the stoppers 51 are fixed in place by the bolt 53 and square nut 52 which is inserted into the T shape groove 32. When a plurality of side frames 1 are in series lengthwise, stoppers 51 are only placed at the two ends of the support plate 12. Further, each sprocket 6 is supported on the holder 55 by the shaft and the holder 55 is fixed to the drawn member 30 by the bolt 57 and square nut 56 which are inserted into the T shape groove 38. Further, the base plate 2 is fixed to the lower face of the drawn member 30 by the bolt 59 and square nut 58 which are inserted into the T shape groove 39. Further, as shown in FIG. 6, the solenoid stopper 123 which is provided in the space between the rollers 4 is assembled through the support plate 124 and the lead wire 125 goes through an appropriately prepared bore hole 126 and is bundled with the cable 17 in the space 122. Further, the pipes 18 are similarly supplied to the space 122.

Further, as shown in the drawings, in the case of the two-stage conveyor, the upper side base plate 2a is fixed to the upper face of the drawn member 30 by the bolt 61 and the square nut 60 which are inserted into the T shape groove 40. In this way, the T shape grooves 38, 39 and 40 are employed and a variety of members can be fixed to the drawn member 30 and for example, a tray stopper and a motor box etc. can be fixed in the appropriate place on the drawn member 30.

Next, the assembly method of the abovementioned composition will be explained with reference to FIG. 4, a drawn member 30, just long enough for the conveyor, is pre-cut. There is no need for a bolt hole to fix the drawn member 30 in place and it is fixed to the base plate 2 by the square nut 58 and bolt 59. Then the roller support plate 12 and the vertical chain support plates 14 and 15 are inserted from the end of the L shape groove 31, 33 and 34. The chain 5 is placed on the vertical support plates 14 and 15 and each holder 55 which supports the sprockets 6 is held in place by the square nut 56 and the bolt 57 to complete the winding of the chain 5. Then the rollers 4 are inserted in order from the top into the roller support plate 12 shown in FIG. 1 and the assembly of the rollers which is fixed by the clip 48 takes place. There is no necessity to consolidate the rollers 4 into the roller plate 12 beforehand and the rollers 4 can be put together during the assembly of the conveyor as a whole and so the work time for assembly is reduced. Further, both ends of the roller support plate 12 are fixed in place by the stoppers 51 shown in FIG. 4. Then the protection plate 13 is inserted into the two step groove 35 from above, pushes down on the spacer 49 shown in FIG. 1 and is fixed in place. Further, the tray stopper 123 shown in FIG. 6 and the cylinder for sideways ejection of the trays, not shown, utilise the appropriate groove and are fixed in place and the lead 125 for the stopper 123 and the pipe 18 for cylinder are pulled out in order into the space 122 and are put into the space 122 as a cable 17 and pipes 18. Next, the upper portion of the mask plate 16 is inserted into the upper groove 36, the lower portion of the mask plate 16 is inserted into the lower groove 37 and the assembly is completed. Further, when the cable 17 is checked, if the mask plate 16 is removed, it can be checked easily. Because of this, the mask plate 16 is made up of a number of short plates so that it is able to be removed in part. Furthermore, the cable 17 and pipe 18 cannot be seen from the outside because of the mask plate 16 and the conveyor looks simple on the outside as well as being physically protected, and the pipe and wire installation can be done easily.

Furthermore, when the spacer 49 is removed by the driver, the protection plate 13 can be easily removed and maintenance is easy. Furthermore, by using the insert groove of the drawn member, two or more drawn members can easily be linked together.

Furthermore, in the abovementioned conveyor the case where the rollers 4 are employed as transfer members has been described. However, it is possible to use the endless conveyor belt as a transfer member. Further, the two-step conveyor for feeding out and back can also be easily assembled when the drawn member and the base plate are assembled together.

The conveyor of the present invention employs a drawn member having an insert groove as right and left side frames and because the main section of the conveyor is assembled simply by inserting the roller support plate into the insert groove of the drawn member, it is possible to easily and quickly assemble and the assembly step of a relatively small and short conveyor used for transporting trays in a textile factory can be completed in a short time and it is possible to produce a conveyor cheaply which is appropriate for a variety of transfer lines.

Further, in the conveyor of the present invention a drawn member having an indentation lengthways along the outer surface is used as right and left side frames and provided with a groove in both edges of the indented section into which it is possible to insert the cover so that a space is formed by the mask plate in the inside of the abovementioned indented section. If the wires and pipes are put into this space, they are out of sight and because it is easy to keep them fixed in place, the number of man hours consumed in assembly and the number of parts used can be significantly reduced.

Furthermore, the conveyor of the present invention employs a drawn member having an insert groove as right and left side frames and into which the roller support plate is inserted and supported, a plurality of cuts into which a roller shaft section is inserted into the roller support plate from above are provided, and is provided with a means by which once the roller shaft section has been inserted the cut is closed. The roller support plate is inserted and supported in the insert groove of the drawn member and the roller shaft section is inserted from above into the roller support plate cut and the cut is closed by the closing means, and by simply closing the cut, the support of the roller is completed simply and quickly.

Also, in the present invention, a drawn member having an insert groove is provided as right and left side frames and the link member straddles the drawn members in the lengthwise direction and is inserted and fixed into the insert grooves of both drawn members and by simply being straddled, the link member between the drawn members is held in place and the link of the two drawn members in the lengthwise direction can be simply and quickly completed.

Further, in the conveyor of the present invention, a drawn member is provided as right and left side frames and a groove is provided in the drawn member into which can be inserted from above the protection plate of the transfer member and the protection plate is held in place by the spacer which is pushed into the gap between the protection plate and the groove. By simply inserting the protection plate into the insert groove from above and pushing the spacer into the gap between the protection plate and the groove, the conveyor can be assembled, and if the spacer is removed, the protection plate can be removed so the removal of the protection plate can take place quickly and the man hours required for assembly are reduced.

What is claimed is:

1. A conveyor comprising:
   a right and left side frame for holding a plurality of transfer members for supporting transfer objects, the right and left side frames each comprising at least one member having an outer surface defining a longitudinal indentation provided with at least one insertion groove, and
   a mask plate configured for insertion into the insertion groove of the indentation to thereby form a substantially enclosed space when the mask plate is inserted into the indentation.

2. A conveyor comprising:
   a right and left side frame for holding a plurality of transfer rollers for supporting transfer objects, the right and left side frames each comprising at least one member provided with at least one insertion groove, at least one of the plurality of transfer rollers having a roller shaft,
   at least one roller support plate configured for insertion into the insertion groove, the roller support plate defining at least one opening into which the roller shaft is insertable from above, and
   means for closing the opening defined in the roller support plate after the roller shaft has been inserted into the opening.

3. A conveyor comprising:
   a right and a left side frame for holding a plurality of transfer members for supporting transfer objects, the right and left side frames each comprising at least one member provided with at least one insertion groove,
   at least one transfer member protection plate configured for insertion into the insertion groove from above, the transfer member protection plate and the insertion groove mutually defining a gap therebetween, and
   a spacer configured for insertion into the gap between the insertion groove and the protection plate for fixing the protection plate in place.

* * * * *